Patented July 19, 1938

2,124,165

UNITED STATES PATENT OFFICE 2,124,165

DYESTUFFS OF THE ANTHRIMIDE CARBAZOLE SERIES

Ralph N. Lulek, Milwaukee, and Clarence F. Belcher, South Milwaukee, Wis., assignors to E. I. du Pont de Nemours & Company, Wilmington, Del., a corporation of Delaware No Drawing. Application May 18, 1934, Serial No. 726,293

4 Claims. (Cl. 260—46)

This invention relates to the preparation of new dyestuffs of the anthrimide carbazole series having the following general formula:

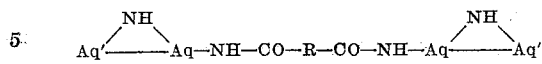

wherein R represents an aliphatic, carbocyclic or heterocyclic radical and the Aq's represent anthraquinone radicals. These new di - alpha, alpha - (dianthrimide - carbazole) -dicarboxylic acid di-imides represent a new type of vat colors which dye cotton in extremely fast shades, ranging from orange to brown and olive.

In our U. S. Patent 2,045,304 of June 23, 1936, we have disclosed the preparation of a new series of di-alpha, alpha-(anthraquinonyl-amino-anthraquinone)-dicarboxylic acid di-imides which are valuable intermediate products for the preparation of dyestuffs. These compounds are prepared by condensing amino-chloro-anthraquinone compounds with aliphatic or cyclic dicarboxylic acid chlorides and further condensing the resulting products with amino-anthraquinones to produce compounds of the general formula:

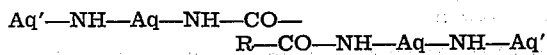

wherein R and Aq have the same meaning as above given.

According to the present invention these di-(anthraquinonyl-amino-anthraquinone) - dicarboxylic acid di-imides are converted into dyestuffs containing carbazole linkages by means of condensing agents such as concentrated sulfuric acid, monohydrate, chlorosulfonic acid or by other acid condensing agents such as aluminum chloride with or without the use of a solvent.

The following examples are given to more fully illustrate our invention. The parts used are by weight.

Example 1

10 parts of terephthaloyl-bis-(5-imino-5'-benzoylamino-1,1'-dianthrimide) are dissolved in 150 parts of sulfuric acid monohydrate at 5–10° C. The greenish-brown colored solution is then stirred at room temperature for 2–3 hours or until the solution color has changed to violet. The melt is then drowned on ice and the suspension oxidized with 5 parts of sodium bichromate at 90–95° C. for 2 hours. The product is filtered, washed and dried. It is an orange powder soluble in concentrated sulfuric acid with a blue color; it dissolves in alkaline hydrosulfite solution with a brownish color and dyes cotton in orange yellow shades fast to light, washing and chlorine.

Example 2

10 parts of terephthaloyl-bis-(4-imino-5'-benzoylamino-1,1'-dianthrimide) are dissolved in 200 parts of concentrated sulfuric acid at 5–10° C. The melt is stirred at room temperature until the olive color has changed to a violet brown. The mass is then poured in ice water and heated under addition of 5 parts of sodium bichromate to the boil. The appearance of the product changes from almost black to brown. The precipitate is filtered off, washed and dried. It vats with reddish brown color and dyes in reddish brown shades of very good fastness.

Example 3

If, in the foregoing example, the terephthaloyl-bis-(4-imino-5'benzoylamino-1,1' - dianthrimide) is replaced by terephthaloyl-bis-(5-amino-4'-benzoylamino-1,1'-dianthrimide) a dyestuff is obtained dyeing cotton in brown shades from a brown vat.

Example 4

If terephthaloyl - bis-(4-imino-4'-benzoylamino-1, 1'-dianthrimide) is treated according to the foregoing examples, a blackish product is obtained which dyes cotton in olive shades.

Example 5

10 parts of benzophenone-p,p'-dicarbonyl-bis-(5-imino-5'-benzoylamino-1,1'-dianthrimide) are dissolved in 200 parts of monohydrate at 10–15° C. The melt is agitated at 20–30° C. for 5–8 hours or until the yellow-brown solution has assumed a violet to reddish-blue color. The mass is then drowned into 2500 parts of ice water and oxidized with 5 parts of potassium bichromate at 90–95° C. for several hours. The precipitate is filtered, washed and dried or made into a paste. The new vat color dyes in orange shades from an orange brown vat.

Example 6

If, in the above example, the benzophenone derivative is replaced by p,p'-diphenyl-dicarbonyl-bis-(5-imino-5'-benzoylamino-1,1'-dianthrimide) a similar dyestuff is obtained.

Example 7

10 parts of terephthaloyl-bis-(5-imino-5'-benzoylamino-1,1'-dianthrimide) are suspended in 100 parts of nitrobenzol and cooled to 5–10° C. 5–7 parts of aluminum chloride are then added and the mass stirred at room temperature for 1½–2 hours. The melt is then drowned into ice water and after addition of HCl steam distilled. The residue is filtered and washed with water. The product may be purified by oxidation with hypochlorite solution. It is identical with the dyestuff obtained according to Example 1.

In a similar manner terephthaloyl-bis-(5-imino-1,1′-dianthrimide) may be ring-closed to produce a yellow-brown dyestuff.

This invention contemplates the preparation of dyestuffs generally, having the formula:

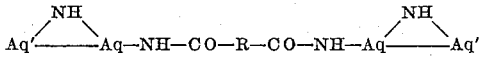

wherein the R represents an aliphatic, carbocyclic or heterocyclic radical of a dicarboxylic acid such as are disclosed in the specific examples above given, or other dicarboxylic acids of the aliphatic, carbocyclic or heterocyclic series such as diphenylmethane-3,3′- or 4,4′-dicarboxylic acids; naphthalene-dicarboxylic acids; isophthalic acid; diphenylether-3,3′- or 4,4′-dicarboxylic acid; terphenyl-dicarboxylic acids; perylene dicarboxylic acids; diphenylene oxide dicarboxylic acid; phenanthrene dicarboxylic acid; diphenylene-2,2′-azone-dicarboxylic acid; succinic acid; adipic acid; fluorenone dicarboxylic acids; quinoline dicarboxylic acid; carbazole dicarboxylic acids; diphenylene-sulfide-dicarboxylic acids, etc. Also in accordance with the disclosure in our copending application above mentioned, the anthraquinone radicals designated by the symbol Aq′ may contain substituents such as hydroxy, methoxy, halogen, amino, or acidylamino groups of the aliphatic or aromatic series such as p-toluyl-sulfonamido-, phthalimido-, acetylamido-, benzoylamino-, naphthoylamino-, anthraquinonoylamino-, etc. In general, the products obtainable by the process described in our U. S. Patent 2,045,304 of June 23, 1936 may be converted into valuable dyestuffs by effecting ring-closure of the anthrimide groups with the aid of acid condensing agents.

The final oxidation of the product to the keto form may be carried out in the known manner with any desired oxidizing agent, such as sodium dichromate, nitrites, or with hypochlorites in alkaline medium. In place of the nitrobenzene used in the specific examples, other similarly high boiling solvents such as trichlorobenzene or substituted nitrobenzenes may be used.

We claim:
1. A compound of the general formula:

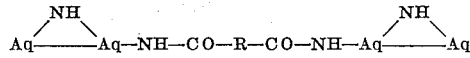

wherein R stands for an organic radical of an organic dicarboxylic acid and wherein the Aq's represent anthraquinone radicals, the anthraquinone acid imide linkages and the amino groups of the carbazole linkage all being attached to the anthraquinone radicals in alpha-positions.

2. Compounds of the general formula:

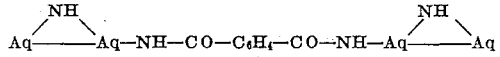

in which Aq represents anthraquinone groups attached to the acid imide and to the amine groups of the carbazole linkages in alpha-position.

3. Compounds of the general formula:

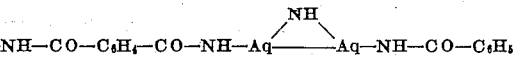

wherein the Aq's represent anthraquinone groups to which the acid imide and the imide groups of the carbazole linkages are attached in the 1,5-position.

4. Compounds of the general formula:

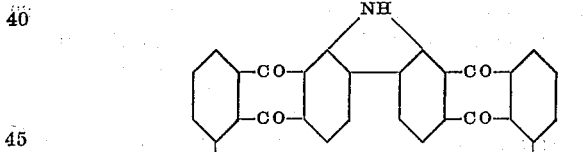 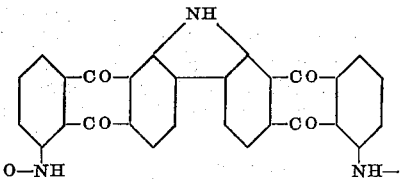

in which R represents an organic radical of an organic dicarboxylic acid and R′ represents organic radicals of an organic carboxylic acid.

RALPH N. LULEK.
CLARENCE F. BELCHER.